United States Patent
Barrer et al.

[15] 3,674,709
[45] July 4, 1972

[54] ALUMINOSILICATES CONTAINING SODALITE AND/OR CANCRINITE CAGES ENCAPSULATING SALTS

[72] Inventors: Richard M. Barrer, Bromley, England; John F. Cole, Amsterdam, Netherlands

[73] Assignee: Air Products and Chemicals, Inc., Wayne, Pa.

[22] Filed: Oct. 8, 1969

[21] Appl. No.: 864,909

[30] Foreign Application Priority Data

Oct. 11, 1968 Great Britain......................48,308/69

[52] U.S. Cl..........................252/454, 252/455 Z, 252/459, 23/113
[51] Int. Cl. .......................................B01j 11/58, B01j 11/40
[58] Field of Search.....................................252/455 Z, 454; 23/111–113

[56] References Cited

UNITED STATES PATENTS

| 3,322,690 | 5/1967 | Bilisoly...................................252/455 |
| 3,373,109 | 3/1968 | Frilette et al. .........................252/455 |
| 3,037,843 | 6/1962 | Mason...................................23/112 R |

OTHER PUBLICATIONS

Barrer et al.– Journal Chemical Soc.– Great Britain, 1952, pages 1,561– 1,571

*Primary Examiner*—C. F. Dees
*Attorney*—B. Max Klevit and John R. Ewbank

[57] ABSTRACT

Kaolinite and a salt are subjected to hot aqueous alkali for at least 2 days to prepare a crystalline zeolite (e.g., cancrinite and/or sodalite) having the salt encapsulated in the cages of the crystalline zeolite.

9 Claims, No Drawings

ALUMINOSILICATES CONTAINING SODALITE AND/OR CANCRANITE CAGES ENCAPSULATING SALTS

GENERAL BACKGROUND

This invention relates to aluminosilicate structures containing sodalite and/or cancrinite cages in which salts are encapsulated during formation of the compounds so that they cannot be released except by decomposing the silicates i.e., the size of the encapsulated salts is less than that of the cage but exceeds that of the largest cage opening.

Such compounds with encapsulated or "caged" salts have a wide range of utility depending upon the nature of the salts encapsulated. Thus if the trapped salts are phosphates or nitrates, the compounds can be used as soil nutrients wherein the phosphates and nitrates are slowly released in soils during weathering. If the trapped salts are perchlorates, chlorates or chromates, the compounds can be used to release oxygen gently in specialized oxidations at higher temperatures.

The crystalline structures containing the encapsulated salts can also serve as single or dual function catalysts depending upon the nature of the trapped salts and the structure of the aluminosilicate. Thus the instant compounds can function as single hydrogenation-dehydrogenation catalysts where the encapsulated salts are those of the Group VI$b$ metals, converted to their oxide form, such as the chromates, molybdates, and tungstates; or those of the Group I$b$ metals, such as copper, silver or gold; or of the Group VIII metals, such as nickel, palladium and platinum and generally reduced to their metallic form. The identification of the Group I$b$, VI$b$ and VIII is in accordance with the periodic table of the elements as set forth on page B–3 of the Handbook of Chemistry and Physics, 48th Edition, 1967–1968, The Chemical Rubber Co., Cleveland, Ohio.

The aluminosilicates with the encapsulated catalytic salts, oxides or metals overcome a particular disadvantage encountered when the catalysts are used in a conventional manner, namely, the agglomeration of the metals due to heat which decreases the available catalytic surface and consequently the catalytic efficiency. In the instant compounds, the integrity of the spacing of the encapsulated catalysts is maintained at all times and the catalysts cannot agglomerate unless the compound is subjected to those conditions required to break the cage, such as decomposing the silicates with mineral acids.

Where the compounds are broken down by heating the resultant material may still be a very intimate mixture comprising the chemical constituents alumina, silica, metal oxide or salt of a catalytically active type, and alkali metal oxide. Such material can also be a valuable catalyst, so that the present invention provides a method for producing such intimate mixtures.

The instant compounds can also function as dual function catalysts where the sodalite and/or cancrinite cages are joined in such a manner as to provide a catalytically active crystalline structure such as faujasite and the encapsulated material is itself catalytic. Thus the faujasite structure functions as a cracking catalyst, i.e., catalyzing reactions including cracking, isomerization, alkylation, polymerization, etc., whereas the encapsulated Group I$b$, VI$b$, and VIII salts, oxides and/or metals function simultaneously as hydrogenation-dehydrogenation catalysts. For example, if residual gas oil is passed through the instant dual function catalyst in the presence of hydrogen and under cracking conditions, the oil will be upgraded to a refinable stock.

The compounds containing the encapsulated salts, i.e., salts intercalated in sodalite and/or cancrinite cages are made by recrystallizing kaolinite in the presence of heated aqueous solutions of caustic soda containing sodium salts at an elevated temperature for at least 2 days. For example, said solution may be heated for 5 days at about 80° C. The following Table I sets forth examples of the preparation of a wide range of sodalite and cancrinite-type phases containing intercalated salts. The phases appeared in yields which were usually nearly quantitative. The encapsulated salts could not be released except by decomposing the silicates with mineral acids. In general NaOH was also imbibed in varying amounts with the imbibed salts and the products contained zeolitic water. The zeolitic water was removed continuously on heating at temperatures rising to 400° C.

TABLE I

The examples set forth herein were carried out by reacting 2 g. kaolimite with 200 ml. of an aqueous NaOH (4M) solution plus Na salts (10 g. unless otherwise stated) at 80° C for 5 days.

| Example | Na salt in reaction Composition | Imbibed Salt | Type of Aluminosilicate Framework |
|---|---|---|---|
| 1 | NaCl | NaCl | Sodalite |
| 2 | NaBr | NaBr | " |
| 3 | NaI | NaI | " |
| 4 | NaClO$_3$ | NaClO$_3$ | " |
| 5 | NaClO$_4$ | NaClO$_4$ | " |
| 6 | Na$_2$SO$_3$ | Na$_2$SO$_3$ | " |
| 7 | Na$_2$S | Na$_2$S | " |
| 8 | Na$_2$WO$_4$ | Na$_2$WO$_4$ | " |
| 9 | Na$_3$PO$_4$ | Na$_3$PO$_4$ | " |
| 10 | HCO$_2$Na | HCO$_2$Na | " |
| 11 | CH$_3$CO$_2$Na | CH$_3$CO$_2$Na | " |
| 12 | C$_2$O$_4$Na$_2$ | C$_2$O$_4$Na$_2$ | " |
| 13 | Na$_2$SO$_4$ | Na$_2$SO$_4$ | Cancrinite |
| 14 | Na$_2$SeO$_4$ | Na$_2$SeO$_4$ | " |
| 15 | Na$_2$CrO$_4$ | Na$_2$CrO$_4$ | " |
| 16 | Na$_2$MoO$_4$ | Na$_2$MoO$_4$ | " |
| 17 | Na$_3$VO$_4$ | Na$_3$VO$_4$ | " |
| 18 | NaMnO$_4$ (large excess) | NaMnO$_4$ + Na$_2$MnO$_4$ | " |
| 19 | NaNO$_3$ | NaNO$_3$ | " |
| 20 | Cu(NH$_3$)$_4$SO$_4$ in presence of excess aqueous NH$_3$ | Cu(NH$_3$)$_4$SO$_4$ Na$_2$SO$_4$ | " |
| 21 | 2g. Na$_2$Fe$^{VI}$O$_4$ $_M$ + 20M NaOH | Fe(III) compound | " |
| 22 | 2g. Na$_2$Fe$^{VI}$O$_4$ in 30 ml. 10M NaOH + 2g. silica (precipitated) | | |

The compositions of the salt-bearing sodalite-and cancrinite-type phases shown in Table I may be represented as 6(NaAlSiO$_4$.$X$salt, $y$H$_2$O,$z$NaOH. Extrapolation of water content versus caustic soda concentration to give the water content at zero caustic soda concentration in solution, indicates for "sodalite hydrate," a formula 6(NaAlSiO$_4$), 8H$_2$), with 14.5 wt percent water. This represents 4 water molecules per sodalite cage. The product synthesized in 4M NaOH has water and sodium hydroxide contents of about 8,7 and 6.5 wt percent respectively, corresponding with 6(NaAlSiO$_4$),4.8 H$_2$O,1.6aOH. Thus two molecules of water are displaced by one of caustic soda. This displacement ratio will be considered to apply for all water: caustic soda proportions in the sodalite-type phases.

With respect to the sodalite-type phases with imbibed NaClO$_4$, Example 5, Table I, analysis of those phases with the highest perchlorate loadings showed their compositions to approach 6(NaAlSiO$_4$),2NaClO$_4$, so that in this case one NaClO$_4$ molecule (or ion-pair) fills each sodalite cage and is therefore spatially equivalent to four molecules of water (or two of caustic soda). These empirical relationships between the space filling properties of H$_2$O, NaOH and NaClO$_4$ relate the coefficients $x$, $y$ and $z$ as follows:

$$4x + y + 2z = 8$$

Assuming that $y/z = 3$ in all cages not occupied by NaClO$_4$, as in the basic sodalite-type phase 6(NaAlSiO$_4$),4.8H$_2$),1.6N aOH prepared in 4M NaOH, we may now calculate $x$, $y$ and $z$ for all the perchlorate-bearing sodalite-type phases.

If A, B and C represent the wt percent of intracrystalline NaClO$_4$, H$_2$O and NaOH, then $$x = \frac{6.97A}{100 - A - B - C} \qquad y = \frac{47.33B}{100 - A - B - C}$$

$$z = \frac{21.3C}{100 - A - B - C}$$

When these expressions are combined with $4x + y + 2z = 8$ and $y/z = 3$ and solved simultaneously the values of $x$, $y$ and $z$ are as given in Table II. It should be noted that A and B are experimentally determined quantities. However, in the calculated only A was used and B, C, $x$, $y$ and $z$ calculated. The calculated and observed values of B are then compared in Table II.

TABLE II

Compositions of Sodalite-type phases $6(NaAlSiO_4).x NaClO_4, yH_2O, zNaOH$

| A($NaClO_4$) wt % Measured | B($H_2O$) wt % Meas. Calc. | C(NaOH) wt % Calc. | $x$ | $y$ Calc. | $z$ Calc. | Cubic unit- Cell edge Calc. (obs) A |
|---|---|---|---|---|---|---|
| 0.86 | 7.64 8.29 | 6.14 | 0.07 | 4.63 | 1.54 | 8.86 |
| 6.54 | 6.54 6.09 | 4.51 | 0.55 | 3.48 | 1.16 | 8.98 |
| 10.77 | 5.49 4.46 | 3.30 | 0.92 | 2.59 | 0.86 | $9.00_8$ |
| 15.33 | 4.25 2.70 | 2.00 | 1.33 | 1.60 | 0.53 | 9.01 |
| 16.50 | 3.10 2.25 | 1.67 | 1.44 | 1.34 | 0.44 | 9.01 |
| 20.93 | 1.51 0.54 | 0.40 | 1.86 | 0.33 | 0.11 | $9.01_2$ |

The variations and mutual inter-dependencies of $x$, $y$ and $z$ are clearly seen, although observed and calculated values of B do not correspond very closely. This could reflect inaccuracies in the relations $4x + y + 2z = 8$ and $y/z = 3$. Many of the phases recorded in Table I were also examined from the above point of view and were found to behave similarly.

Of those crystallizations of Table I which yielded cancrinite-type phases (Examples 13–20) it is interesting to note what happens as the salt concentration is reduced because in the absence of salts only basic sodalite-type crystals appear. Either progressive randomization in the layer sequence could occur, the 12 . . . sequence in the cancrinitic phases being replaced more and more by 123 . . . sequences in each crystal, or separate crystals related to sodalite and cancrinite could form simultaneously. Experiments conducted on the system Kaolinite + NaOH + $H_2O$ + $NaNO_3$, see Example 9, Table I, showed that in this case separate crystals related to sodalite and cancrinite were formed side by side as seen in Table III below. The ability of such small amounts of $NaNO_3$ to promote formation of cancrinitic crystals is remarkable, and may be a consequence of the size and symmetry of the nitrate ion in relation to that of the cancrinite framework cavities. A similar crossover was observed in the system Kaolinite-NaOH—$H_2O$—$Na_2CrO_4$ of the type set forth in Example 15, Table I.

TABLE III

| Example | Conc. of $NaNO_3$ (moles $Kg^{-1}H_2O$) | Type of Aluminosilicate Framework |
|---|---|---|
| 23 | 2.0 | cancrinite |
| 24 | 0.99 | cancrinite + traces sodalite |
| 25 | 0.066 | as above |
| 26 | 0.013 | cancrinite + sodalite |
| 27 | 0.007 | as above |
| 28 | 0.0039 | as above |
| 29 | 0.0023 | sodalite |

Some of the phases in Table I possessed properties of considerable interest. For example, when heated above 500° C, the chlorate- and perchlorate-bearing near-sodalites, Examples 4 and 5, transpired oxygen, and were converted to thermallystable sodalites with imbibed NaCl. The cubic unit-cell edges of samples decreased by about 2 percent during this process. For the highest $NaClO_4$ loading in Table II (20.93 wt. percent) this corresponds to an oxygen storage capacity of 76.6 cm³ g⁻¹ at STP. Such compounds may therefore be of use for specialized high temperature oxidation processes, or in other specialized applications requiring gentle high temperature release of known quantities of oxygen.

The cancrinite-type phase bearing tetrammine Cu(III) sulphate, Example 20, when heated below 500° C, transpired ammonia and water, as evidenced by chemical tests, DTA and thermogravimetric investigations. The product was a thermally-stable near-cancrinite with imbibed $CuSO_4$ and $Na_2SO_4$. This compound, and several others, could then be reduced by appropriate means to give metallic dispersions within and without the aluminosilicate framework. For example, the pale blue-gray tetrammine Cu(II) sulphate near-cancrinite was heated to 500° C in a stream of dry nitrogen to remove $NH_3$ and $H_2O$, and was then purged with hydrogen at the same temperature. A color change to pink was observed which was accompanied by the disappearance of certain superstructural X-ray powder lines of the original pattern, and by changes in the unit-cell parameters. Excessive or prolonged heating caused the powder lines of metallic copper to appear, demonstrating migration and aggregation at the surface of the crystals, of intracrystalline copper atoms.

Similar results were obtained using pure sodium vapor as the reducing agent and carrying out the reactions under dynamic vacuum in a special quartz apparatus. The sample was dried in an oven at 350° C and then outgassed at 500° C while suspended over pure sodium metal. The latter was then heated to 500° C. This method was also applied to the chromaterich near-cancrinites, to produce chromium, predominantly in oxidation state III and possibly with traces of the metal and other oxidation states, eg., Cr(V). The changes could be followed visually and by electron spin resonance spectroscopy. Thus the yellow parent compound was rendered bright green by sodium vapor, and a broad paramagnetic resonance absorption was observed at $g \approx 2.033$ corresponding to chromium (III). A second (weak) signal at $g \approx $1.97 was probably due to small amounts of chromium (V).

The iron-bearing cancribite-type species of Example 21 was prepared from kaolinite and a 10M NaOH solution of sodium ferrate ($NaFe^{II}O_4$) made by the chlorine oxidation method. The Mössbauer spectrum of this near-cancrinite at room temperature establishes that the iron is in oxidation state (III). The quadrupole splitting of $0.63 \pm 0.05$ mm sec⁻¹ and the isomer shift of $+0.30 \pm 0.05$ mm sec⁻¹ (relative to iron metal), indicate some covalent bonding of iron, for example, to oxygen. These observations are further supported by the ESR spectrum at room temperature, which showed a strong absorption at $g \approx 2.0$. Analysis gave a Si/Al ratio of 1.06 indicating that no aluminum in the framework has been replaced by iron. Thermogravimetric investigations showed a weight loss of 7.7 percent below 500° C, characteristic of zeolitic water, and a high temperature loss of 7.3 percent which was most rapid at 750° C. The product after ignition to constant weight at 1,000° C was shown by X-ray powder photography and Mössbauer spectroscopy to be a mixture of nepheline and $\alpha - Fe_2O_3$. These observations are consistent with the imbibition of iron compounds which must be at least partly in the oxidation state III. It is interesting that even in such a highly reactive system as the present one, the felspathoid crystallization takes place with no apparent ill-effects, and with simultaneous imbibition of suitable species from solution.

The species of Example 22, herein designated H, appeared in minor yield together with the iron-bearing cancrinite discussed above. It crystallized as beautiful, perfectly formed 0.1 mm tetrahedra colored pale-green to pale red brown. It was soluble with some effervescence in dilute HCl and could be made in the absence of alumina but was never observed in the absence of silica. Side-reactions made it impossible to get a pure sample suitable for analysis. H was cubic, with a unit cell edge of 9.50 A and systematic absences in its X-ray powder pattern, Table IV below suggested that it was probably body centered.

TABLE IV d-Spacings Of Species H

| d(A)obs. | d(A)calc. ($a_0 = 9.50A$) | I | hkl |
|---|---|---|---|

| | | | |
|---|---|---|---|
| 6.74 | 6.718 | s | 110 |
| 4.75 | 4.750 | m | 200 |
| 3.89 | 3.878 | s | 211 |
| $3.36_8$ | 3.359 | w | 220 |
| $3.00_0$ | 3.004 | w | 310 |
| $2.74_5$ | 2.742 | vs | 222 |
| 2.540 | 2.539 | s | 321 |
| 2.375 | 2.375 | m | 400 |
| 2.240 | 2.239 | m | 411,330 |
| 2.122 | 2.124 | m | 420 |
| 1.935 | 1.939 | w | 422 |
| 1.860 | 1.863 | w | 510,431 |
| 1.735 | 1.734 | w | 521 |
| 1.680 | 1.679 | s | 440 |
| 1.630 | 1.629 | s | 530,433 |
| 1.583 | 1.583 | m | 600,442 |
| 1.540 | 1.541 | m | 611,532 |
| 1.430 | 1.432 | m | 622 |
| 1.400 | 1.401 | w | 631 |
| 1.372 | 1.371 | w | 444 |

On this basis H could not be identified with any known compound. It is possible that H is a sodalite-type compound in which part of the framework aluminum has been replaced by iron. The Fe(III)—O bond-length for tetrahedral coordination is 1.86 A (cf. Al(III)—O, 1.75 A) and a simple calculation shows that replacement of all Al by Fe in a sodalite type of framework should result in an increase in unit-cell edge to about 9.7 A (cf. 9.5 A observed).

The instant compounds also can be made to encapsulate the metals of Group VIII, such as Pt, Pd and Ni. Thus a suitable base soluble salt, such as sodium platinate may be the sodium salt for inclusion in the reaction composition as shown in Table I in which case the salt will be encapsulated in the sodalite and/or cancrinite cages and upon subsequent reduction with hydrogen will result in metallic Pt in the cages for use as hydrogenation, dehydrogenation catalyst.

We claim:

1. The method of preparing composite materials consisting essentially of salts encapsulated in cages of crystalline zeolites which method includes the steps of:

recrystallizing an aqueous system by heating for at least 2 days an aqueous system consisting predominantly of water and containing sodium hydroxide, kaolinite, and a salt soluble in an alkaline aqueous system, said salt comprising a cation and an anion, at least one of said ions comprising a metal;

separating the solids from said recrystallization; and washing the solids to provide a composite material consisting of a crystalline zeolite and encapsulated salt, said composite material corresponding to the formula:

$$6(\text{Na Al SiO}_4) \cdot x \text{ salt} \cdot y \text{ H}_2\text{O} \cdot z \text{ NaOH}$$

in which $x$ is a value from 0.1 to 2 and $y$ and $z$ have values from 0 to 7.6, and in which $4x + y + 2z$ is 8, and in which $y/z$ has a minimum value of 3, said crystalline zeolite being a member of the group consisting of:

sodalite, cancrinite,

Zeolite H having a cubic unit cell edge of about 9.5 Angstroms, said Zeolite H having X-ray diffraction measurements corresponding to Table IV, and mixtures thereof.

2. The method of claim 1 in which the product is a sodalite.

3. The product of claim 2 in which the sodalite has a formula corresponding to $$6(\text{Na Al SiO}_4) \cdot x \text{ Na ClO}_4 \cdot y \text{ H}_2\text{O} \cdot z \text{ NaOH}$$

in which $x$ has a value greater than 1, said sodalite having a capacity for generating oxygen when heated.

4. The method of claim 1 in which an ion of the salt comprises a metal susceptible of a plurality of stable valences, the product being treated with a reducing gas to at least partially reduce such metal ion and to provide a supported catalyst.

5. The method of claim 4 in which a cancrinite containing encapsulated cupric ammonium sulfate is treated with hydrogen to provide a copper cancrinite catalyst.

6. A catalyst prepared by reduction of the product of claim 5.

7. The method of claim 1 in which sodium ferrate is the salt and in which the product is an iron-salt imbibed' Zeolite H having X-ray diffraction measurements corresponding to Table IV.

8. The method of claim 1 in which sodium nitrate is the salt and a cancrinite containing sodium nitrate is the product.

9. The method of claim 1 in which the sodium hydroxide concentration is about 4 molar and in which the salt concentration is significantly greater than the kaolinite concentration.

* * * * *

PO-1050
(5/69)

UNITED STATES PATENT OFFICE
CERTIFICATE OF CORRECTION

Patent No. 3,674,709          Dated July 4, 1972

Inventor(s) Richard M. Barrer   --   John F. Cole

It is certified that error appears in the above-identified patent and that said Letters Patent are hereby corrected as shown below:

Column 2, Table 1, Example 21 "2g. $Na_2Fe^{VI}O_4m + 20M\ NaOH$"

should read --2g. $Na_2Fe^{VI}O_4 + 12M\ NaOH$--

Column 2, Line 43 "$6(NaAlSiO_4Xsalt$"

should read --$6(NaAlSiO_4)xsalt$--

Column 2, line 49 "8,7"

should read --8.7--

Column 2, Lines 50-51 "$6(NaAlSiO_4), 4.8\ H_2O, 1.62\ OH$"

should read --$6(NaAlSiO_4), 4.8\ H_2O, 1.6\ NaOH$--

Signed and sealed this 26th day of December 1972.

(SEAL)
Attest:

EDWARD M. FLETCHER, JR.                    ROBERT GOTTSCHALK
Attesting Officer                               Commissioner of Patents